United States Patent
Sydnor (10) Patent No.: US 9,765,816 B2
(45) Date of Patent: Sep. 19, 2017

(54) HYDRODYNAMIC BEARING WITH COMPENSATED HYDROSTATIC PHASE

(71) Applicant: The Boeing Company, Chicago, IL (US)

(72) Inventor: Bryan Sydnor, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 14/853,952

(22) Filed: Sep. 14, 2015

(65) Prior Publication Data

US 2017/0074319 A1    Mar. 16, 2017

(51) Int. Cl.
*F16C 32/06*     (2006.01)
*F16C 17/02*     (2006.01)
*F16C 17/10*     (2006.01)

(52) U.S. Cl.
CPC .......... *F16C 32/0666* (2013.01); *F16C 17/02* (2013.01); *F16C 17/105* (2013.01); *F16C 32/0614* (2013.01); *F16C 32/0659* (2013.01)

(58) Field of Classification Search
CPC .. F16C 32/06; F16C 32/0603; F16C 32/0614; F16C 32/0622; F16C 32/0625; F16C 32/0629; F16C 32/0655; F16C 32/0659; F16C 32/0692; F16C 32/0696
See application file for complete search history.

(56) References Cited

U.S. PATENT DOCUMENTS

| | | | |
|---|---|---|---|
| 3,105,631 A * | 10/1963 | Hanny | F01D 25/22 384/107 |
| 3,242,742 A | 3/1966 | Parker | |
| 3,306,278 A * | 2/1967 | Spatari | F41B 5/0094 124/20.2 |
| 4,366,993 A * | 1/1983 | Ono | F16C 32/0622 384/120 |
| 6,912,795 B1 | 7/2005 | Kennedy et al. | |
| 2003/0183673 A1* | 10/2003 | Hansen | B23K 20/125 228/2.1 |

(Continued)

FOREIGN PATENT DOCUMENTS

DE    WO 2010103100 A1 *    9/2010    .............. F16C 17/02

OTHER PUBLICATIONS

Arindam Ghosal, A Review of Fluid Film Bearing, Proceedings of the 13th Asian Congress of Fluid Mechanics, Dec. 17-21, 2010, pp. 723-728, Dhaka Bangladesh.

(Continued)

*Primary Examiner* — Phillip A Johnson
(74) *Attorney, Agent, or Firm* — Kolisch Hartwell, P.C.

(57) ABSTRACT

A bearing assembly may include a first bearing element defining a first bearing surface and a second bearing element defining a second bearing surface. One of the first and second bearing elements may have a fluid channel with an inlet for receiving a bearing fluid and at least one outlet in the bearing surface of the one of the first and second bearing elements. The first bearing element may be configured for rotation at a design rate of rotation relative to the second bearing element with the first bearing surface facing the second bearing surface. The first bearing element may apply a force directed from the first bearing surface toward the second bearing surface during rotation at a reduced rate of rotation less than the design rate of rotation.

18 Claims, 7 Drawing Sheets

(56) References Cited

U.S. PATENT DOCUMENTS

2005/0249442 A1* 11/2005 Sopper .................. F01D 25/168
                                                              384/121

OTHER PUBLICATIONS

Adam Czaban, CFD Analysis of Hydrodynamic Lubrication of Slide Conical Bearing with Consideration of the Bearing Shaft and Sleeve Surface Roughness, Journal of KONES Powertrain and Transport vol. 21 No. 3, 2014, 6 pages, Gdynia Poland.
Kingsbury, Inc., A General Guide to the Principles, Operation and Troubleshooting of Hydrodynamic Bearings, Mar. 2015, 28 pages, USA.

* cited by examiner

HYDRODYNAMIC BEARING WITH COMPENSATED HYDROSTATIC PHASE

FIELD

This disclosure relates to bearing structures and methods of operation. More specifically, the disclosed embodiments relate to apparatus and methods for operating hydrodynamic bearing assemblies with a hydrostatic operating phase.

INTRODUCTION

Fluid bearings are bearings that support the bearing's loads on a thin layer of fluid and may be broadly classified as fluid dynamic bearings. Hydrodynamic bearings rely on the high speed of the journal to self-pressurize the fluid in a wedge between the bearing surfaces. Fluid bearings are used in high load, high speed, and high precision applications where ordinary ball or roller bearings have a short life or high noise and vibration.

Fluid bearings use a thin layer of liquid or gas between bearing surfaces, and are typically sealed around or under the rotating shaft or bearing sleeve. In fluid-dynamic or hydrodynamic bearings rotation draws the fluid onto the inner surface of the bearing, forming a lubricating layer under or around the shaft. Hydrodynamic bearings may have high friction and short life at speeds lower than design speeds, such as during starts and stops due to failure of the bearing fluid to separate the bearing surfaces.

SUMMARY

The present disclosure provides fluid-film operation of a bearing assembly. In some embodiments, a bearing assembly may include a first bearing element defining a first bearing surface and a second bearing element defining a second bearing surface. One of the first and second bearing elements may have a fluid channel with an inlet for receiving a bearing fluid and at least one outlet in the bearing surface of the one of the first and second bearing elements. The first bearing element may be configured for rotation at a design rate of rotation relative to the second bearing element with the first bearing surface facing the second bearing surface. The first bearing element may apply a force directed from the first bearing surface toward the second bearing surface during rotation at a reduced rate of rotation less than the design rate of rotation.

In some embodiments, a method may include pumping a bearing fluid through an opening in a bearing surface of one of first and second bearing elements of a bearing assembly, the first and second bearing elements having respective facing first and second bearing surfaces, and into a gap between the first and second bearing surfaces. While pumping, the first bearing element may be rotated relative to the second bearing element at a reduced rate of rotation that is below a design rate of rotation. The rate of rotation may be increased from the reduced rate of rotation to the design rate of rotation.

Features, functions, and advantages may be achieved independently in various embodiments of the present disclosure, or may be combined in yet other embodiments, further details of which can be seen with reference to the following description and drawings.

DESCRIPTION

Overview

Various embodiments of a bearing assemblies having a fluid channel in bearing elements are described below and illustrated in the associated drawings. Unless otherwise specified, a bearing assembly and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other bearing assemblies. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

A bearing assembly may include first and second bearing elements configured for hydrodynamic operation at a range of rates of relative rotation that may include a design rate of rotation. The first bearing element may define a first bearing surface and a fluid channel having an inlet for receiving a bearing fluid and at least one outlet in the first bearing surface. The second bearing element may define a second bearing surface. One of the first and second bearing elements may be configured for rotation at the design rate of rotation relative to the other of the first and second bearing elements with the second bearing surface facing the first bearing surface. The other bearing element may apply a force directed from the bearing surface of the other bearing element toward the bearing surface of the one bearing element during rotation at a reduced rate of rotation less than the design rate of rotation, such as during hydrostatic operation of the bearing assembly.

Definitions

As suggested above, during hydrodynamic operation of bearings, the rate of rotation of one bearing element relative to another bearing element is sufficient to cause a bearing fluid to be forced between the facing bearing surfaces of the bearing, forming a lubricating layer between the bearing surfaces.

EXAMPLES, COMPONENTS, AND ALTERNATIVES

The following sections describe selected aspects of exemplary bearing assemblies as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 1:
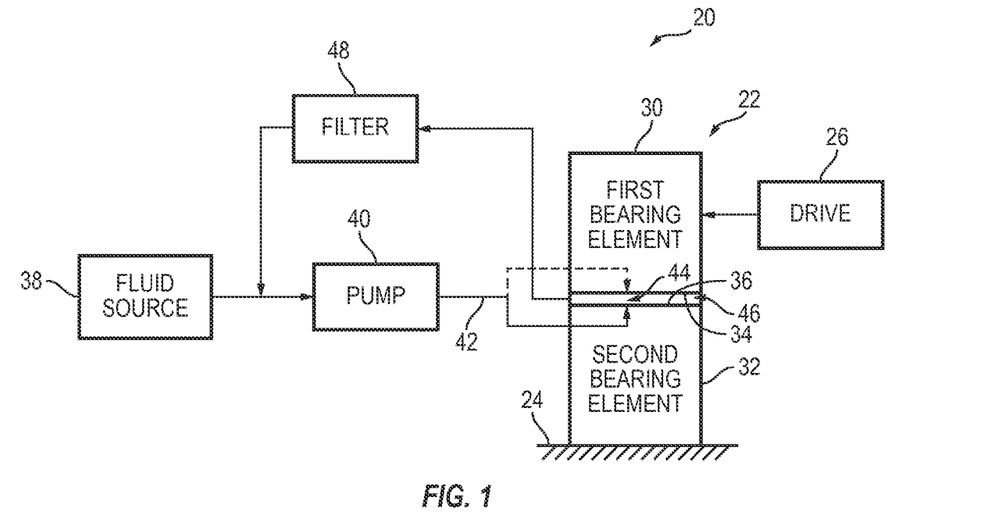
FIG. 1 is a block diagram showing an example of a hydrodynamic bearing system including a bearing assembly and a bearing fluid circuit.

FIG. 1 illustrates an exemplary bearing system 20 including a bearing assembly 22 mounted relative to an external structure 24, a bearing drive 26, and a bearing fluid system 28. Bearing assembly 22 may include a first bearing element 30 and a second bearing element 32.

In this example, first bearing element 30 is driven by bearing drive 26 to rotate around second bearing element 32. Second bearing element 32 is fixed relative to the external structure 24. External structure 24 may be any structure or reference other than the second bearing element 32 relative to which first bearing element 30 moves. External structure 24 may thus be a structure that is fixed relative to earth or a vehicle, or may be a structure connected to second bearing element 32 with the first and second bearing elements 30 and 32 counter rotating relative to an earth or vehicle frame of reference.

First bearing element 30 may include a first bearing surface 34 and second bearing element 32 may include a second bearing surface 36. When first bearing element 30 moves relative to second bearing element 32, first bearing surface 34 faces second bearing surface 36.

Bearing drive 26 may be any structure that transfers a mechanical rotational force to first bearing element 30. For example, in the case of a wind turbine or water turbine, drive 26 may include the turbine blade and any intervening structure connecting the first bearing element 30 to the turbine. In the case of an airplane propeller or other motor driven assembly, the bearing drive 26 may include the associated motor and the intervening structure connecting the motor to the first bearing element 30.

Bearing fluid system 28 may include a fluid source 38 of a bearing fluid suitable for the particular application. The bearing fluid may be a gas, such as air, in some applications. In other applications, a liquid of a suitable viscosity may be used, such as a selected fluid-film-bearing oil. A pump 40 pumps the bearing fluid from the fluid source 38 in between first and second bearing surfaces 34 and 36 through a fluid channel 42. During operation, a fluid film 44 is formed in a gap 46 that may be created by the force of the bearing fluid being pumped into gap 46. As in a conventional hydrodynamic bearing assembly, the bearing assembly 22 is suitably sealed to contain the flow of bearing fluid. Bearing fluid that has passed through the bearing assembly 22 may be discarded, or it may be filtered by a filter 48 and returned to pump 40 for reuse.

Example 2

Figure 2:
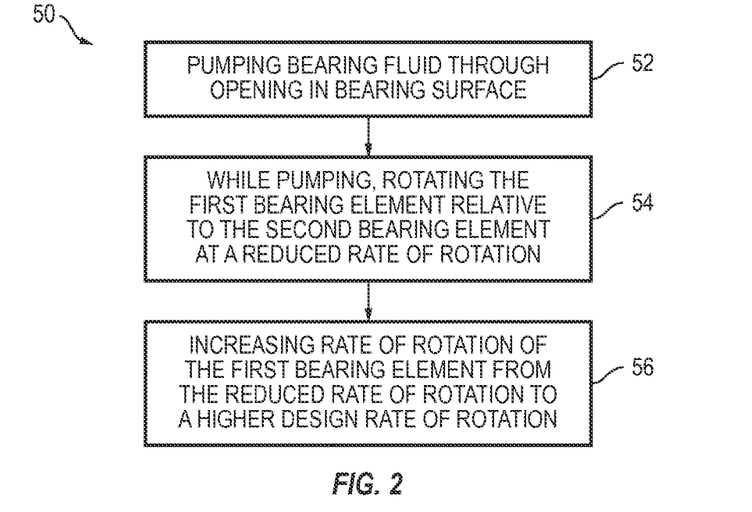
FIG. 2 is a flow chart illustrating an example of a method of operating the bearing system of FIG. 1.

This example describes a method for operating bearing system 20; see FIG. 2. Aspects of bearing system 20 may be utilized in the method steps described below. Where appropriate, reference may be made to previously described components and systems that may be used in carrying out each step, and further components may be described with regard to the examples below. These references are for illustration, and are not intended to limit the possible ways of carrying out any particular step of the method.

FIG. 2 is a flowchart illustrating operations or steps performed in an illustrative method, and may not recite the complete process or all steps of the method. FIG. 2 depicts multiple steps of a method, generally indicated at 50, that may be performed in conjunction with a bearing system 20. Although various steps of method 50 are described below and depicted in FIG. 2, the steps need not necessarily all be performed, and in some cases may be performed in a different order than the order shown.

At step 52, pump 40 may pump a bearing fluid through an opening in first bearing surface 34 of first bearing element 30 of bearing assembly 22 and into a gap 46 between first bearing surface 34 and a second bearing surface 36 of second bearing element 32 of bearing assembly 22. At step 54, while pumping, one of the first and second bearing elements 30 and 32 may be rotated relative to the other of the first and second bearing elements 30 and 32 at a reduced rate of rotation that is below a design rate of rotation. At step 56, the rate of rotation may be increased from the reduced rate of rotation to the design rate of rotation.

During startup of an apparatus or mechanical system for example, first bearing element 30 may be rotated from a fixed or non-rotating state relative to the second bearing element 32 up through a range of rotational speeds to a target or design rate of rotation. The target or design rate of rotation may be a specific design rate of rotation or it may be in a range of design rates of rotation. Rotating the first bearing element 30 relative to the second bearing element 32 within a design range of rates of rotation may be fast enough to cause the bearing assembly 22 to function as a hydrodynamic bearing in which the bearing fluid is drawn into gap 46 between the first and second bearing surfaces 34 and 36 by the dynamic action of the first bearing surface 34 on the bearing fluid.

At reduced rates of rotation, the bearing assembly 22 may not function hydrodynamically. During operation at these reduced rates of rotation, pump 40 drives the bearing fluid through an opening in second bearing surface 36 into gap 46. The force of the bearing fluid on first bearing surface 34 pushes first bearing surface 34 away from second bearing surface 36, preventing wear of the two bearing surfaces. As shown by the dashed lines in FIG. 1, in some examples, the bearing fluid may be pumped through an opening in the first bearing surface 34 instead of or in addition to pumping the bearing fluid through an opening in the second bearing surface 36.

Example 3

This example describes an illustrative journal bearing assembly 60 having a first bearing element 62 and a second bearing element 64; see FIGS. 3-6. Bearing assembly 60 may be included in a bearing system, such as bearing system 20 shown in FIG. 1.

Figure 3:
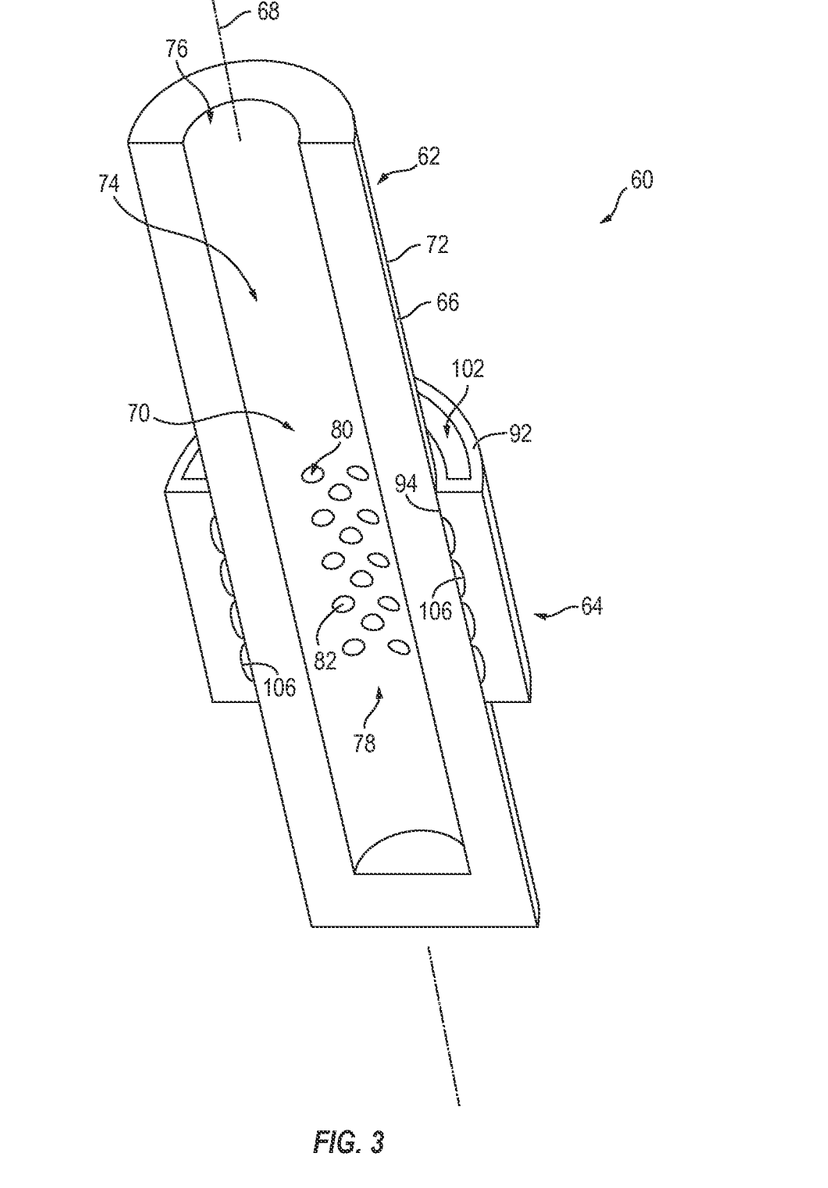
FIG. 3 is an axial cross-section of an example of a journal bearing assembly having a fixed shaft.

In this example, first bearing element 62 is fixed relative to an external reference. First bearing element 62 is a cylindrical shaft 66 extending along a longitudinal axis 68. Longitudinal axis 68 preferably extends at least partially horizontally and as a result, shaft 66 has an upper portion 70. Shaft 66 includes an outer bearing surface 72.

An axial fluid channel 74 extends through the shaft 66 to communicate bearing fluid with an array 78 of radial fluid channels 80. Axial fluid channel 74 includes an inlet 76, represented by the inlet end of axial fluid channel 74, for receiving bearing fluid from a pump, such as pump 40. At least one radial fluid channel 80 is included in array 78. Each radial fluid channel 80 includes an inlet 82 for receiving bearing fluid from axial channel 74 and an outlet 84 in bearing surface 72.

Figure 6:
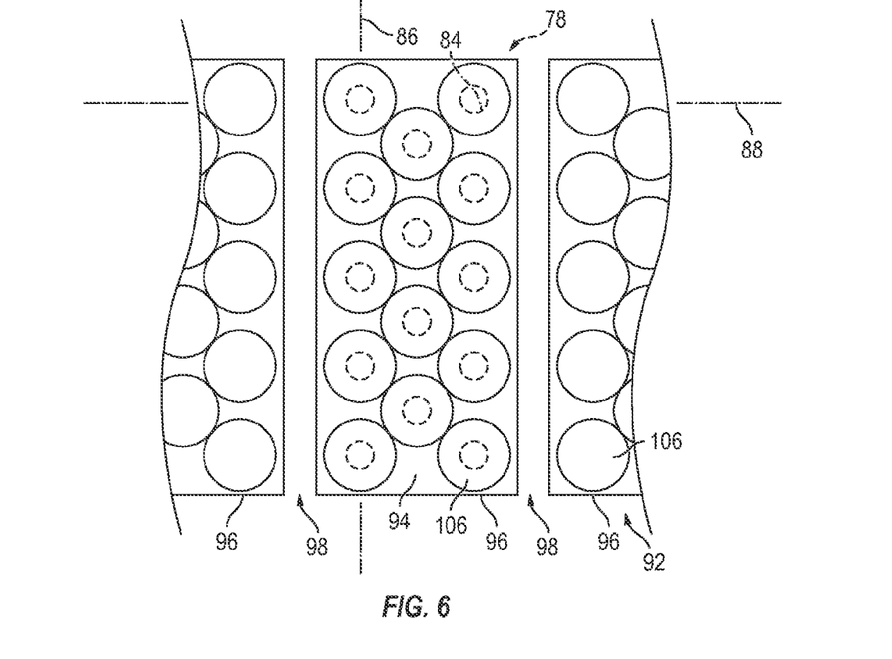
FIG. 6 is a two-dimensional illustration of a pattern of bearing fluid outlets in one bearing surface of the bearing assembly of FIG. 3 relative to a pattern of depressions in another bearing surface facing the one bearing surface.

In this example, array 78 includes a plurality of radial fluid channels 80 disposed in three axially extending rows, which rows are distributed circumferentially in the upper portion 70 of shaft 66. Each radial fluid channel, including inlet 82 and outlet 84, are aligned and extend radially through shaft 66. The outlets 84 are thus also distributed in array 78. FIG. 6 illustrates in a two-dimensional view of array 78 of outlets 84 shown in dashed lines. The outlets 84 extend in each row along an axially extending line, such as line 86 extending parallel to longitudinal axis 68.

In this example, the two outer rows each have five radial fluid channels 80 and associated outlets 84. Each outlet 84 of a radial fluid channel 80 in an outer row is circumferentially aligned with a corresponding outlet 84 of a radial fluid channel 80 in the other outer row, and correspondingly extend along a common circumferential line, such as line 88.

Figure 4:
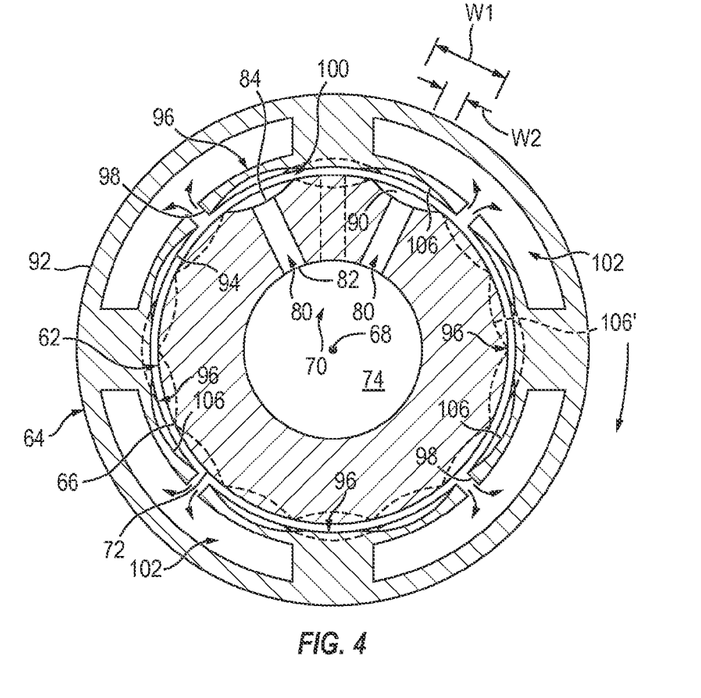
FIG. 4 is a radial cross-section of the fixed-shaft journal bearing assembly of FIG. 3.

The middle row of four outlets 84 is positioned between the two outer rows. The individual outlets 84 in the middle row are displaced axially and circumferentially from the outlets 84 in the two outer rows. As shown in FIGS. 3 and 4, array 78 of outlets 84 may be positioned on shaft 66 symmetrically about the middle row on the upper portion 70 of shaft 66, with the middle row of outlets 84 positioned at the top-most point on the shaft. It will be appreciated that array 78 is intended for illustration purposes, and may be configured many different ways, and a configuration may be selected to suit a particular application. The radial fluid channels 80 feeding bearing fluid to outlets 84 may also have other configurations that may extend along a path that varies from the radial paths shown in FIG. 4. For example, fluid channels 80 may extend any suitable direction or path configuration appropriate for a given application, such as diagonally or other angle transverse to a radial line, spirally or other curved path, or irregularly.

As shown particularly in FIG. 4, the bearing surface 72 of shaft 66 may include a recess 90 aligned with each outlet 84. Recesses 90 are generally curved surfaces in this example, such as spherical caps, although other configurations may be used. Each recess 90 has a width W1 that is greater than a width W2 of each outlet 84. Each recess 90 provides a broader area for the bearing fluid to distribute and apply against the second bearing element. Other configurations for recess 90 may be used, such as a recess having a flat base or a conical surface. In some examples no recesses 90 are associated with the outlets 84.

Figure 5:
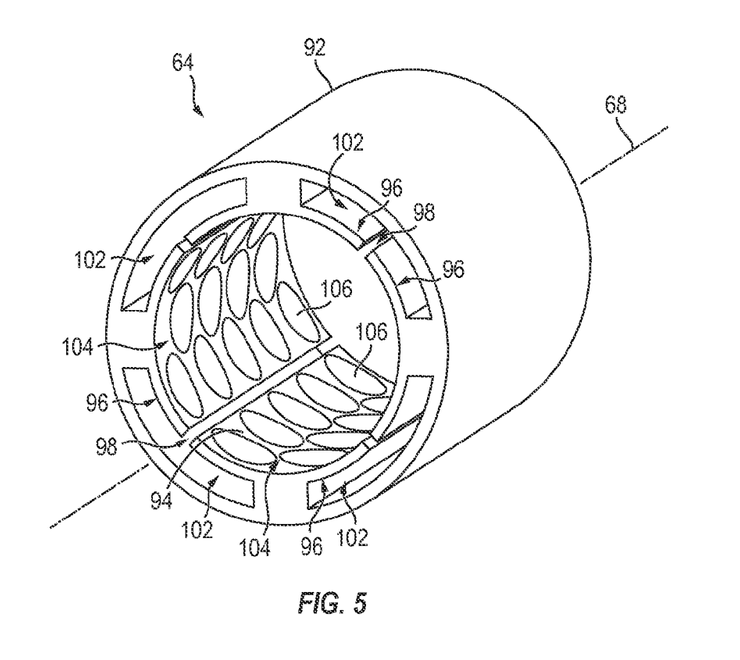
FIG. 5 is an isometric view of a bearing sleeve of the fixed-shaft journal bearing assembly of FIG. 3.

Second bearing element 64 is a bearing sleeve 92 having an inner bearing surface 94 that may be continuous or discontinuous. FIG. 5 is an isometric view of bearing sleeve 92 without shaft 66. Bearing sleeve 92 is configured to rotate relative to shaft 66 about longitudinal axis 68. Longitudinal axis 68 is thus also an axis of rotation for bearing sleeve 92.

Bearing surface 94 in this example includes four segments 96 each spanning a circumferential arc of slightly less than 90 degrees, as shown particularly in FIG. 4. Adjacent segments 96 are separated by a slot 98 extending axially along sleeve 92. Slots 98 provide bearing fluid communication between a gap 100 between bearing surfaces 72 and 94 and a bearing-fluid-return channel 102 formed in sleeve 92 for conducting bearing fluid away from the bearing surfaces 72 and 94.

Bearing surface 94 is configured to provide a variation in a distance between bearing surfaces 72 and 94 along a circumferential line around sleeve 92. Recesses 90 in bearing surface 72 are seen to also provide a circumferentially varying distance between the upper portion 70 of bearing surface 72 and bearing surface 94.

Bearing surface 94 on each segment 96 includes an array 104 of depressions 106. Array 104 of depressions 106 is of the same configuration as array 78 of outlets 84 of shaft 66. FIG. 6 illustrates a portion of the segments 96 of bearing sleeve 92 at a position in which the outlets 84 are aligned with depressions 106 of one segment 96. The outline of representative segments 96 and associated depressions 106 are illustrated in solid lines. It is seen that array 78 of outlets 84 have a one-to-one correspondence with all of the depressions 106 in each segment. Accordingly, the depressions 106 are aligned in longitudinal rows, such as the row aligned with line 86, and circumferential columns as indicated by line 88. As bearing element 64 rotates around bearing element 62, there are a series of circumferentially distributed depressions 106 in a column aligned to pass serially past and directly opposite at least one outlet 84 during rotation of the second bearing element relative to the first bearing element. Alternating with the columns of depressions 106 aligned with outlets 84 are circumferentially offset columns of depressions that overlap with recesses 90 as the sleeve 92 rotates around shaft 66.

Other configurations may also be used. For example, a depression 106 may only partially align during rotation with an outlet 84 or a recess 90, thereby providing a fluid channel between bearing surfaces 72 and 94 for fluid to flow into the depressions. Other depressions 106 may be spaced from and not align with an outlet 84 or recess 90, with bearing fluid flowing into them once bearing surface 94 is separated from bearing surface 72 by the action of the bearing fluid on bearing surface 94 proximate the outlets 84. In some examples, depressions 106' may be formed in the same bearing element as the outlets 84, which is shaft 66 in this example, as shown in dash-dot lines. Thus, the depressions and outlets may be on the same bearing element or may be on different bearing elements. In some examples, both outlets and depressions also may be on both bearing elements.

During operation, when sleeve 92 is not rotating and when sleeve 92 is rotating at low speeds, without the pumping of bearing fluid through outlets 84 into gap 100, the top or upper portion of sleeve 92, as shown in FIG. 4, rests on the top or upper portion 70 of shaft 66 in what may be considered a hydrostatic state. Preferably before or concurrently with the beginning of rotation of sleeve 92 relative to shaft 66, bearing fluid is pumped through axial fluid channel 74, through radial fluid channels 74, and out of outlets 84 into gap 100. The bearing fluid thereby fills recesses 90 and initially also fills the proximate depressions 106. This action forces bearing surface 94 of sleeve 92 upwardly away from the upper portion 70 of shaft 66. The bearing fluid flows around shaft 66 covered by sleeve 92 and through slots 98 into fluid-return channels 102.

Recesses 90 and depressions 106 collectively and separately provide variations in distance between the shaft and sleeve bearing surfaces 72 and 94 as the bearing surface 94 of bearing element 64 moves along the bearing surface 72 of the bearing element 62 during rotation of the bearing element 64 relative to bearing element 62. Thus, even when sleeve 92 is at rest or at low or reduced rates of rotation, there is a gap 100 into which bearing fluid can be distributed during pumping.

The pumping of fluid preferably continues until the rate of rotation of sleeve 92 is sufficient for the bearing assembly 60 to operate in a hydrodynamic state. The rates of rotation in which the bearing assembly 60 is in a hydrodynamic state may be considered to be design or target rates of rotation or range of rates of rotation. Pumping may be continued during operation at the design rates of rotation to filter contaminants from the bearing fluid as well as to provide a fluid film between bearing surfaces 72 and 94 should the bearing sleeve 92 rotate at reduced rates of rotation below the design rates of rotation.

Example 4

Figure 7:
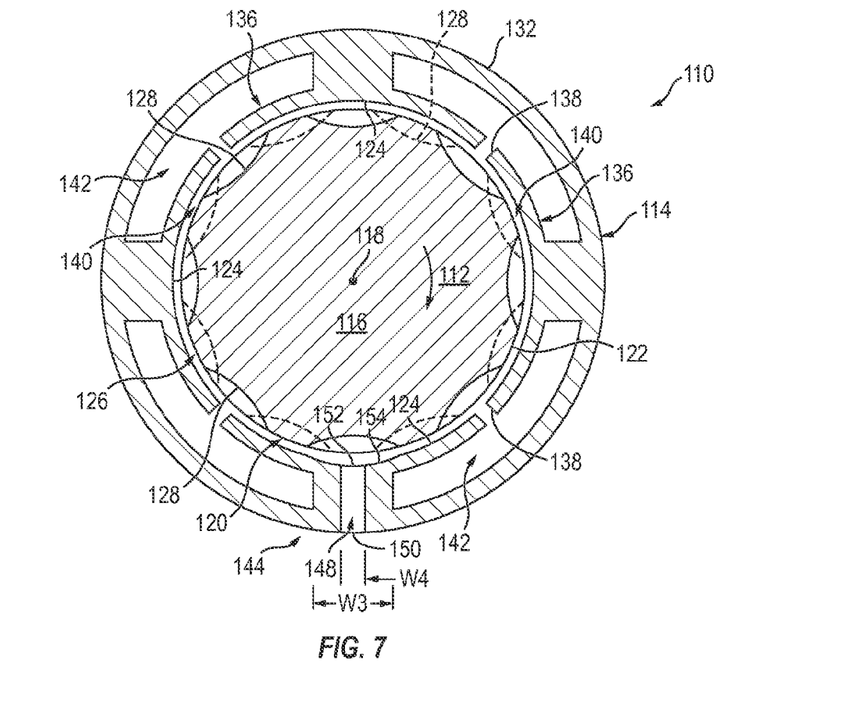
FIG. 7 is a radial cross-section of an example of a journal bearing assembly having a fixed bearing sleeve.
Figure 8:
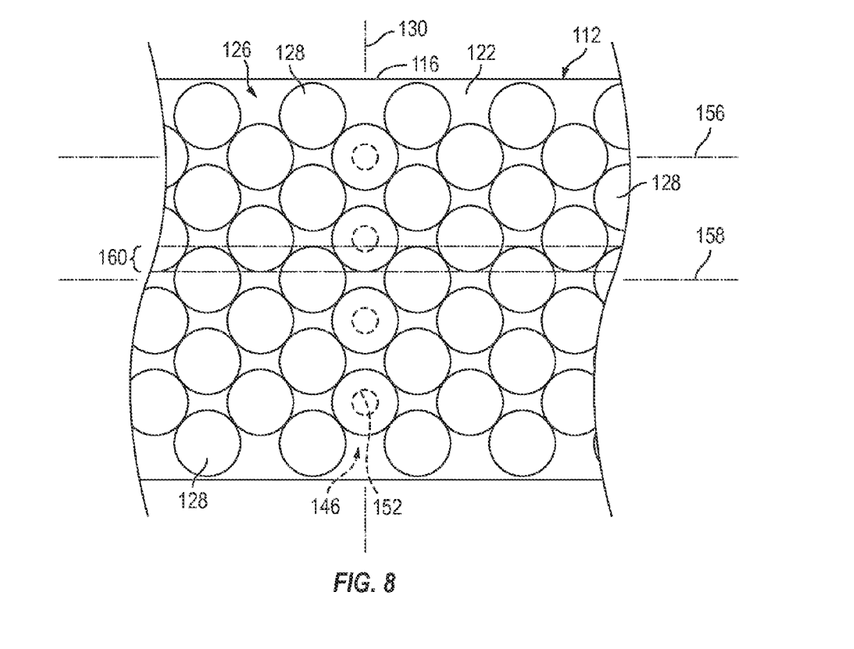
FIG. 8 is a two-dimensional illustration of a pattern of bearing fluid outlets in one bearing surface of the bearing assembly of FIG. 7 relative to a pattern of depressions in another bearing surface facing the one bearing surface.

This example describes an illustrative bearing assembly 110 having a journal or rotating first bearing element 112 and a fixed second bearing element 114; see FIGS. 7 and 8. Bearing assembly 110 may be included in a bearing system, such as bearing system 20 shown in FIG. 1.

In this example, first bearing element 112 is configured to rotate relative to second bearing element 114 and relative to an external reference. First bearing element 112 is a cylindrical shaft 116 extending along a longitudinal axis of rotation 118. Longitudinal axis 118 preferably extends at least partially horizontally and as a result, shaft 116 has a lower portion 120 for any given rotational position of shaft 116. Shaft 116 includes an outer bearing surface 122 that faces an inner bearing surface 124 of second bearing element 114. Bearing surface 122 is configured to provide a variation in a distance between bearing surfaces 122 and 124 along a circumferential line around shaft 116.

Bearing surface 122 on shaft 116 includes an array 126 of depressions 128. As shown in FIG. 8, depressions 128 are disposed in longitudinally extending rows. Rows having four depressions, as illustrated by the row along line 130, alternate with rows having five depressions.

Second bearing element 114 is a bearing sleeve 132 having inner bearing surface 124 that may be continuous or discontinuous. Bearing sleeve 132 is similar to bearing sleeve 92 but is configured to be fixed relative to shaft 66 and relative to an external surface. Bearing surface 124 in this example includes four segments 136 each spanning a circumferential arc of slightly less than 90 degrees, as shown particularly in FIG. 7. Adjacent segments 136 are separated by a slot 138 extending axially along sleeve 132. Slots 138 provide bearing fluid communication between a gap 140 between bearing surfaces 122 and 124 and a bearing-fluid-return channel 142 formed in bearing sleeve 132 for conducting bearing fluid away from the bearing surfaces 122 and 124.

Bearing sleeve 132 has a lower portion 144 having an array 146 of radially extending fluid channels 148. At least one radial fluid channel 148 is included in array 146. Each radial fluid channel 148 includes an inlet 150 for receiving bearing fluid from a fluid pump or other bearing fluid source and an outlet 152 in bearing surface 124. In this example, array 146 includes four radial fluid channels 148 disposed in an axially extending row. Each radial fluid channel 148, including inlet 150 and outlet 152, are aligned and extend radially through bearing sleeve 132, as shown in FIG. 7. The outlets 152 are thus also distributed in array 146. FIG. 8 illustrates in a two-dimensional view of bearing surface 122, array 146 of outlets 152 shown in dashed lines. The outlets 152 extend in a row along an axially extending line, such as line 130 extending parallel to longitudinal axis 118.

As shown in FIG. 7, array 146 of outlets 152 may be positioned on bearing sleeve 132 at the lowest point of the lower portion 144 of bearing sleeve 132. It will be appreciated that array 146 is intended for illustration purposes, and may be configured many different ways, and a configuration may be selected to suit a particular application. For example, a configuration similar to array 78 of outlets 84 in shaft 66 may be used, with corresponding changes in the structure of bearing sleeve 132. It will also be appreciated that the radial fluid channels 148 feeding bearing fluid to outlets 152 may also have other configurations that may extend along a path that varies from the radial path shown in FIG. 7.

As shown particularly in FIG. 7, the bearing surface 124 of bearing sleeve 132 may include a recess 154 aligned with each outlet 152. Recesses 154 are generally curved surfaces in this example, such as spherical caps, although other configurations may be used. Each recess 154 has a width W3 that is greater than a width W4 of each outlet 152. Each recess 154 provides a broader area for the bearing fluid to distribute from each outlet 152 and apply against bearing surface 122 of shaft 116 as the bearing element 112. Other than outlets 152 and recesses 154, bearing surface 124 of bearing sleeve 132 is smooth. In other examples, bearing surface may have an array of depressions, such as an array similar to array 104 on bearing surface 94 of bearing sleeve 92.

Array 126 of depressions 128 is similar to array 104 of depressions 106 of bearing sleeve 92 consisting of 4-depression rows alternating with 5-depression rows, except that array 126 is continuous around shaft 116. FIG. 8 illustrates a portion of bearing surface 122 at a position in which the outlets 152 are aligned with the depressions 128 of one row of four depressions 128. The depressions 128 are also aligned in circumferential columns as indicated by lines 156 and 158. As shaft 116 rotates within bearing sleeve 132, the depressions in a column corresponding to line 156 are aligned to pass serially past and directly opposite at least one outlet 152 during rotation. Alternating with the columns of depressions 128 aligned with outlets 152 are circumferentially offset columns of depressions extending in a circumferential line, such as line 158. The depressions 128 overlapping with recesses 154 form a fluid channel between outlets 152 and bearing surface 124 regardless of whether there is a gap 140 between the bearing surfaces 122 and 124 where recesses and depressions do not exist. An example of such overlapping is represented by the portions of depressions 128 overlapping with a recess 154 in a band 160 extending through array 126. As mentioned previously, other configurations of outlets, recesses, and depressions may also be used.

Recesses 154 and depressions 128 collectively and separately provide variations in distance between the shaft and sleeve bearing surfaces 122 and 124 as the bearing surface 122 of bearing element 112 (shaft 116) moves along the bearing surface 124 of the bearing element 114 (bearing sleeve 132) during rotation of the bearing element 112 relative to bearing element 114. Thus, even when shaft 116 is at rest or at low or reduced rates of rotation, there is a gap 140 into which bearing fluid can be distributed during pumping.

During operation, when shaft 116 is not rotating and when shaft 116 is rotating at low or reduced rates of rotation, without the pumping of bearing fluid through outlets 152 into gap 140, the bottom or lower portion 120 of shaft 116, as shown in FIG. 7, rests on or contacts the bottom or lower portion 144 of bearing sleeve 132 in what may be considered a hydrostatic state. Preferably before or concurrently with the beginning of rotation of shaft 116 relative to bearing sleeve 132, bearing fluid is pumped through radial fluid channels 148, and out of outlets 152 into gap 140. The bearing fluid thereby fills recesses 154 and initially also fills the proximate depressions 130. This action forces bearing surface 122 of shaft 116 upwardly away from the lower portion 144 of bearing sleeve 132. The bearing fluid flows around shaft 116 covered by bearing sleeve 132 and through slots 138 into fluid-return channels 142. The pumping of fluid preferably continues at least until the rate of rotation of shaft 116 is at design or target rates of rotation or range of rates of rotation, which are sufficient for the bearing assembly 110 to operate in a hydrodynamic state. As mentioned previously, it is preferred to continue pumping for all rates of rotation of shaft 116.

Example 5

Figure 9:
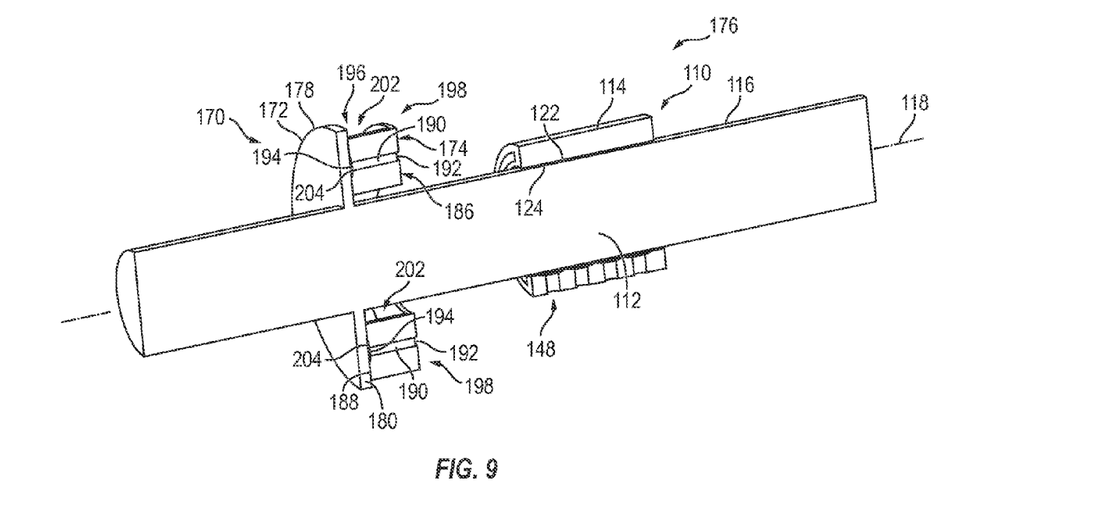
FIG. 9 is an axial cross section of a combination bearing system including a journal bearing assembly having a fixed bearing sleeve and a thrust bearing assembly with a fixed bearing ring.
Figure 10:
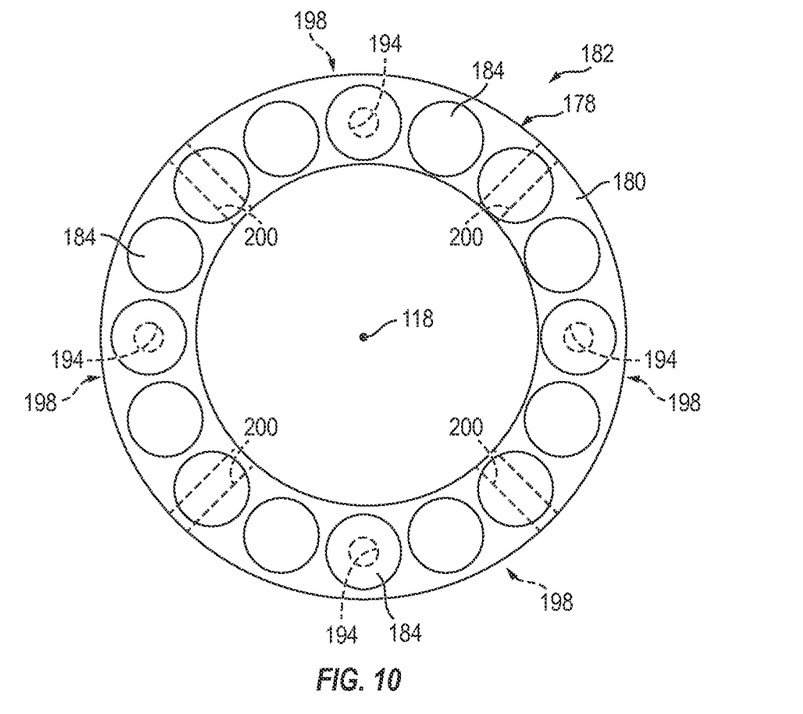
FIG. 10 is a two-dimensional illustration of an example of a pattern of bearing fluid outlets in one bearing surface of one bearing ring of the thrust bearing assembly of FIG. 7 relative to a pattern of depressions in another bearing surface of another bearing ring facing the one bearing surface.

This example describes an illustrative thrust bearing assembly 170 having first bearing element 172 and second bearing element 174; see FIGS. 9 and 10. FIG. 9 is an axial cross-section view of a combination bearing assembly 176 including thrust bearing assembly 170 and journal bearing assembly 110, just described.

In this example, first bearing element 172 includes a flange or shaft ring 178 attached to and extending radially from shaft 116. Shaft ring 178 has a bearing surface 180 extending in a plane orthogonal to axis of rotation 118. FIG. 10 is an axial view of bearing surface 180 showing an array 182 of depressions 184 configured like the depressions described in the preceding examples. Depressions 184 are disposed at a common radial position from axis of rotation 118. There are 16 depressions in this example that are equally spaced circumferentially.

Second bearing element 174 is a bearing ring 186 having a bearing surface 188 directly facing bearing surface 180. Four fluid channels 190 extend axially through bearing ring 186 at equally circumferentially spaced positions. Each fluid channel 190 has an inlet 192 for receiving bearing fluid and an outlet 194 in bearing surface 188. Outlets 194 are openings through which bearing fluid is distributed in a gap 196 between bearing surfaces 180 and 188. Bearing ring 186 preferably is divided into four segments 198 by intervening slots 200 intermediate outlets 194, as illustrated in dashed lines in FIG. 10. Slots 200 provide fluid communication between gap 196 and a fluid-return channel 202 formed in bearing ring 186. Each outlet 194 has an associated recess 204 with a width greater than the width of the associated outlet 194. Recesses 204 are generally curved surfaces in this example, such as spherical caps, although other configurations may be used. Outlets 194 and recesses 204 are positioned to align with depressions 184 as shaft ring 178 rotates relative to bearing ring 186. In this example, at any given position of bearing ring 186, each recess 204 overlaps with one or two depressions 184.

As with the previously described journal bearing assemblies, during operation, at no and reduced rates of rotation of shaft 116, bearing fluid is pumped through fluid channels 190 into gap 196, forcing bearing surface 180 away from bearing surface 188 countering thrust forces acting axially that urge bearing surface 180 toward bearing surface 188. Bearing fluid is preferably pumped continuously for design rates of rotation as well.

Example 6

Figure 11:
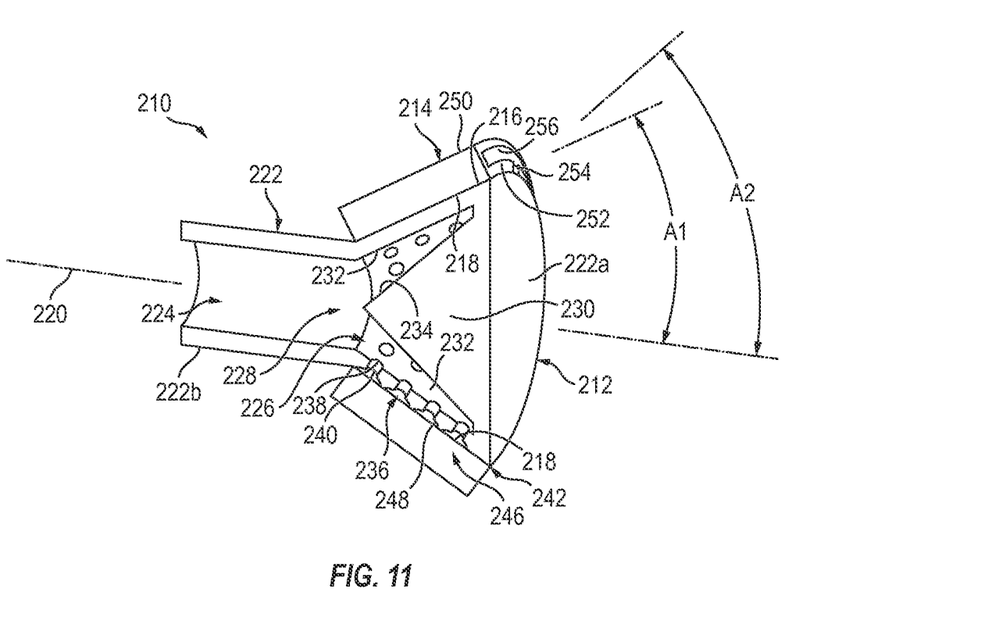
FIG. 11 is an axial cross-section of an example of a fixed-shaft frustoconical bearing assembly.
Figure 12:
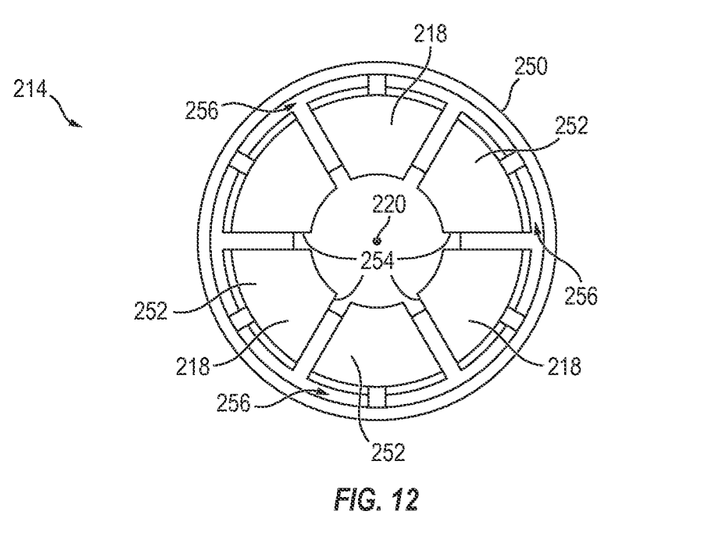
FIG. 12 is an end view of a bearing sleeve of the bearing assembly of FIG. 11.
Figure 13:
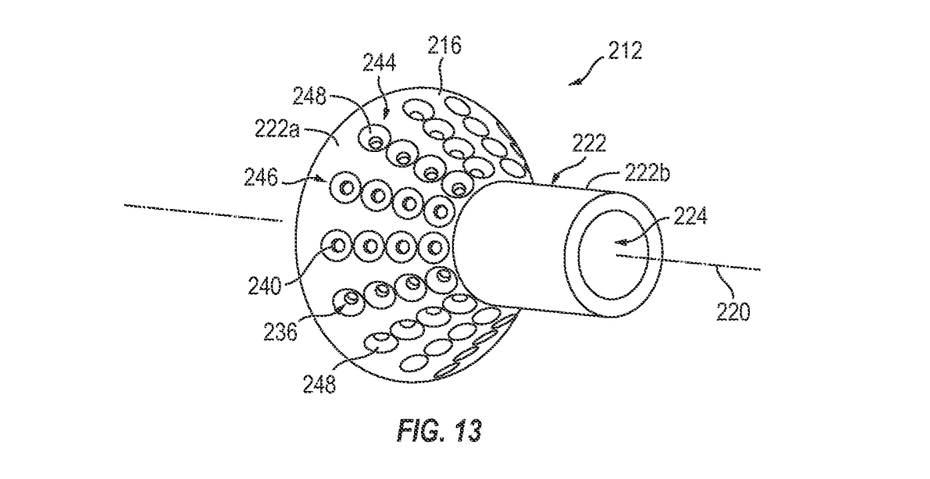
FIG. 13 is an isometric view of a shaft of the bearing assembly of FIG. 11.

This example describes an illustrative dual-purpose bearing assembly 210 having a first bearing element 212 and a second bearing element 214; see FIGS. 11-13. Bearing assembly 210 is dual-purpose in the sense that it applies to both journal (radial) bearing forces and thrust (axial) bearing forces. Bearing element 212 has a bearing surface 216 and bearing element 214 has a bearing surface 218 directly facing bearing surface 216 during rotation of bearing element 214 relative to bearing element 212.

In this example, bearing surfaces 216 and 218 are generally frustoconically shaped, extending at an angle A1 transverse to an axis of rotation 220. Other configurations of the bearing surfaces may also be used. Bearing assembly 210 may provide dual functions with angle A1 as an acute or obtuse angle. Second bearing element 214 forms a bearing portion 222a of a shaft 222. Shaft 222 includes an axially extending cylindrical portion 222b having an axially extending fluid channel 224.

Shaft bearing portion 222a includes a bearing fluid channel 226 having an inlet 228 for receiving bearing fluid from fluid channel 224. A conical plug 230 closes an end of shaft bearing portion 222a opposite from axial fluid channel 224. The outer surface 234 of conical plug 230 diverts from axis 220 at an angle A2 that is greater than angle A1. The point or tip of plug 230 is generally aligned with or proximate inlet 228. Shaft bearing portion 222a has an inner surface 232 that parallels bearing surface 216. Inner surface 232 and outer surface 234 converge with increasing distance from the plug tip. As a result, bearing fluid channel 226 is wider proximate to the plug tip and progressively narrower with increasing distance from the plug tip.

Shaft bearing portion 222a includes a plurality of fluid channels 236 each extending between an inlet 238 at inner surface 232 and an outlet 240 at bearing surface 216. Fluid channels 236 communicate bearing fluid received from bearing fluid channel 226 to a gap 242 between first and second bearing surfaces 216 and 218.

Fluid channels outlets 240 are disposed in an array 244, shown particularly in FIG. 13. In this example, array 244 includes a plurality of rows 246 extending axially along shaft bearing portion 222a. Each row 246 includes a plurality of outlets 240, such as four outlets 240. The rows 246 are distributed symmetrically circumferentially around shaft bearing portion 222a. It will be appreciated that array 244 is intended for illustration purposes, and may be configured many different ways, and a configuration may be selected to suit a particular application. For example, fewer rows 246 of outlets 240 may be included, and depressions, not shown, may be formed in rows between rows 246 of outlets 240, such as if alternate rows of recesses 248 were not associated with outlets. Outlets 240 and depressions may also alternate within rows 246.

It will also be appreciated that the generally radial fluid channels 236 feeding bearing fluid to outlets 240 may also have other configurations that may extend along a path that varies from the radial paths shown in FIG. 11. It is seen that outlets 240 are circumferentially more closely spaced at the narrow end of bearing surface 216 and circumferentially more widely spaced at the broader end of bearing surface 216.

As shown particularly in FIGS. 11 and 13, the bearing surface 216 of shaft 222 may include a recess 248 aligned with each outlet 240. As explained with the previous examples and as shown in the figures, each recess 248 has a width that is greater than a width of each outlet 240. Each recess 248 provides a broader area for the bearing fluid to distribute and apply against the second bearing element. Recesses 248 are generally curved surfaces in this example, such as spherical caps, although other configurations may be used.

Second bearing element 214 is a bearing sleeve 250 having a frustoconical inner bearing surface 218 that may be continuous or discontinuous. FIG. 12 is an axial end view of bearing sleeve 250 without shaft 222. Bearing sleeve 250 is configured to rotate relative to shaft 222 about axis of rotation 220.

Bearing surface 218 in this example includes six segments 252 each spanning a circumferential arc of slightly less than 60 degrees, as shown particularly in FIG. 12. Adjacent segments 252 are separated by a slot 254 extending axially along bearing sleeve 250. Slots 254 provide bearing fluid communication between gap 242 between bearing surfaces 216 and 218, and bearing-fluid-return channels 256 formed in bearing sleeve 250 for conducting bearing fluid away from the bearing surfaces 216 and 218.

In this example, the bearing surface 218 of each segment 252 of bearing sleeve 250 is smooth. In other examples, bearing surface may have an array of depressions, such as an array of depressions circumferentially aligned directly or with overlapping relationship with outlets 240 and associated recesses 248, as has been discussed with reference to preceding examples.

During operation, when shaft 222 is not rotating and when shaft 222 is rotating at low or reduced rates of rotation, without the pumping of bearing fluid through outlets 240 into gap 242 and with a thrust force on bearing sleeve 250, bearing-sleeve bearing surface 218 is in contact with bearing surface 216 of shaft 222 in what may be considered a hydrostatic state. Preferably before or concurrently with the beginning of rotation of shaft 222 relative to bearing sleeve 250, bearing fluid is pumped through fluid channels 224 and 226 into radial fluid channels 236 and out of outlets 240 into gap 242.

The varied radial width of fluid channel 224 with distance from the tip of conical plug 230 is configured to provide a relatively constant bearing fluid pressure at inlets 238 of radial fluid channels 236, resulting in uniform pressure of the bearing fluid against bearing surface 218 of bearing sleeve 250. The bearing fluid thereby fills recesses 248. This action forces bearing surface 218 of bearing sleeve 250 axially away from bearing surface 216 of shaft 222. The bearing fluid flows along the bearing surfaces 216 and 218 and through slots 254 into fluid-return channels 256. The pumping of fluid preferably continues while bearing sleeve 250 is rotating at reduced rates of rotation that are lower than design rates of rotation. The rate of rotation of bearing sleeve 250 is increased to design or target rates of rotation or range of rates of rotation, which are sufficient for the bearing assembly to operate in a hydrodynamic state. As mentioned previously, it is preferred to continue pumping the bearing fluid for all rates of rotation of bearing sleeve 250.

Example 7

This section describes additional aspects and features of bearing assemblies, such as those described in the previous examples. The additional aspects and features are presented without limitation as a series of paragraphs, some or all of which may be alphanumerically designated for clarity and efficiency. Each of these paragraphs can be combined with one or more other paragraphs, and/or with aspects or features described elsewhere in this application in any suitable manner. Some of the paragraphs below expressly refer to and further limit other paragraphs, providing without limitation examples of some of the suitable combinations.

A1. A bearing assembly may include a first bearing element defining a first bearing surface and a second bearing element defining a second bearing surface, one of the first and second bearing elements having a fluid channel with an inlet for receiving a bearing fluid and at least one outlet in the bearing surface of the one of the first and second bearing elements, the first bearing element being configured for rotation at a design rate of rotation relative to the second bearing element with the first bearing surface facing the second bearing surface, the first bearing element applying a force directed from the first bearing surface toward the second bearing surface during rotation at a reduced rate of rotation less than the design rate of rotation.

A2. The bearing assembly of paragraph A1 may further include a pump in fluid communication with the inlet for pumping the bearing fluid through the at least one outlet and between the first and second bearing surfaces while the first bearing element is rotating at the reduced rate of rotation.

A3. The bearing assembly of paragraph A1, wherein at least one of the first and second bearing surfaces is configured to provide a variation in a distance between the first and second bearing surfaces as the first bearing surface moves along the second bearing surface during rotation of the first bearing element relative to the second bearing element.

A4. The bearing assembly of paragraph A3, wherein the at least one of the first and second bearing surfaces includes a plurality of depressions.

A5. The bearing assembly of paragraph A4, wherein the at least one of the first and second bearing surfaces is the first bearing surface, the second bearing element has the fluid channel, and the plurality of depressions include a series of circumferentially distributed depressions aligned to pass serially past the at least one outlet during rotation of the second bearing element relative to the first bearing element.

A6. The bearing assembly of paragraph A5, wherein the at least one outlet has an outlet width and the at least one outlet opens into a recess in the second bearing surface with the recess having a maximum recess width greater than the outlet width.

A7. The bearing assembly of paragraph A4, wherein the fluid channel includes a plurality of outlets including the at least one outlet.

A8. The bearing assembly of paragraph A7, wherein at least a portion of the outlets in the plurality of outlets are distributed relative to each other along the bearing surface of the one of the first and second bearing elements transverse to a direction of movement of the first bearing surface relative to the second bearing surface during rotation of the first bearing element relative to the second bearing element.

A9. The bearing assembly of paragraph A7, wherein at least a portion of the outlets in the plurality of outlets are distributed along the bearing surface of the one of the first and second bearing elements along a direction of movement of the first bearing surface relative to the second bearing surface during rotation of the first bearing element relative to the second bearing element.

A10. The bearing assembly of paragraph A1, wherein the second bearing element is a shaft that is fixed relative to an external structure and extends along a longitudinal axis of rotation of the first bearing element, the longitudinal axis extending at least partially horizontally, and the at least one outlet being disposed in the second bearing surface along an upper portion of the shaft.

A11. The bearing assembly of paragraph A1, wherein the first bearing element is a shaft having a longitudinal axis of rotation extending at least partially horizontally, and the second bearing element is a bearing sleeve that extends around the shaft and is fixed relative to an external structure, the at least one outlet being disposed in the second bearing surface along a lower portion of the bearing sleeve.

A12. The bearing assembly of paragraph A1, wherein the first bearing element is a first bearing ring and the second bearing element is the one of the first and second bearing elements and is a second bearing ring surrounding and fixed relative to a shaft extending along a longitudinal axis extending at least partially horizontally, the second bearing surface extending outwardly from the shaft and transverse to the longitudinal axis.

A13. The bearing assembly of paragraph A12, wherein the first and second bearing surfaces are planar and extend radially relative to the shaft.

A14. The bearing assembly of paragraph A12, wherein the first and second bearing surfaces are frustoconical.

A15. The bearing assembly of paragraph A12, wherein the second bearing element is the one of the first and second bearing elements and the fluid channel includes a plurality of outlets in the second bearing surface including the at least one outlet, the plurality of outlets being distributed at least partially circumferentially around the second bearing ring.

A16. The bearing assembly of paragraph A1, wherein the first bearing element is a first bearing ring surrounding and fixed relative to a shaft extending along a longitudinal axis of rotation extending at least partially horizontally, the first bearing surface extending outwardly from the shaft and transverse to the longitudinal axis, and the second bearing element is the one of the first and second bearing elements and is a second bearing ring.

B2. The method of paragraph B1, wherein the bearing assembly is operating in a hydrostatic state when rotating the first bearing element at the reduced rate of rotation.

B3. The method of paragraph B2, wherein the bearing assembly is operating in a hydrodynamic state when rotating the first bearing element at the design rate of rotation.

B4. The method of paragraph B1, where the first bearing element applies a force acting in a first direction from the first bearing surface toward the second bearing surface during rotation at the reduced rate of rotation, and wherein pumping a bearing fluid includes pumping the bearing fluid through the opening in a second direction at least partially opposite to the first direction.

Advantages, Features, Benefits

The different embodiments of the bearing assembly described herein provide several advantages over known solutions for reducing friction between hydrodynamic bearing elements when operating below hydrodynamic rates of rotation. For example, the illustrative embodiments of bearing assemblies and bearing system described herein allow for rotation at reduced rates below design rates of rotation with reduced friction and wear on the bearing elements. Additionally, and among other benefits, an illustrative embodiment of the bearing assembly described herein allows fluid-film operation at all rates of rotation of the bearing elements for both axial and radial bearing forces in a single bearing assembly. Thus, the illustrative embodiments described herein are particularly useful for high speed rotating components. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A bearing assembly comprising a first bearing element defining a first bearing surface and a second bearing element defining a second bearing surface, one of the first and second bearing elements having a fluid channel with an inlet for receiving a bearing fluid and at least one outlet in the bearing surface of the one of the first and second bearing elements, the first bearing element being configured for rotation at a design rate of rotation relative to the second bearing element with the first bearing surface facing the second bearing surface, the first bearing element applying a force directed from the first bearing surface toward the second bearing surface during rotation at a reduced rate of rotation less than the design rate of rotation; wherein at least one of the first and second bearing surfaces is configured to provide, in an area of the at least one of the first and second bearing surfaces not including the at least one outlet, a variation in a distance between the first and second bearing surfaces as the first bearing surface moves along the second bearing surface during rotation of the first bearing element relative to the second bearing element.

2. The bearing assembly of claim 1, further comprising a pump in fluid communication with the inlet for pumping the bearing fluid through the at least one outlet and between the first and second bearing surfaces while the first bearing element is rotating at the reduced rate of rotation.

3. The bearing assembly of claim 1, wherein the at least one of the first and second bearing surfaces includes a plurality of depressions in the area of the at least one of the first and second bearing surfaces not including the at least one outlet.

4. The bearing assembly of claim 3, wherein the at least one of the first and second bearing surfaces is the first bearing surface, the second bearing element has the fluid channel, and the plurality of depressions includes a series of circumferentially distributed depressions aligned to pass serially past the at least one outlet during rotation of the second bearing element relative to the first bearing element.

5. The bearing assembly of claim 4, wherein the at least one outlet has an outlet width and the at least one outlet opens into a recess in the second bearing surface with the recess having a maximum recess width greater than the outlet width.

6. The bearing assembly of claim 3, wherein the fluid channel includes a plurality of outlets including the at least one outlet.

7. The bearing assembly of claim 6, wherein at least a portion of the outlets in the plurality of outlets are distributed relative to each other along the bearing surface of the one of the first and second bearing elements transverse to a direction of movement of the first bearing surface relative to the second bearing surface during rotation of the first bearing element relative to the second bearing element.

8. The bearing assembly of claim 6, wherein at least a portion of the outlets in the plurality of outlets are distributed along the bearing surface of the one of the first and second bearing elements along a direction of movement of the first bearing surface relative to the second bearing surface during rotation of the first bearing element relative to the second bearing element.

9. The bearing assembly of claim 1, wherein the first bearing element is a shaft having a longitudinal axis of rotation extending at least partially horizontally, and the second bearing element is a bearing sleeve that extends around the shaft and is fixed relative to an external structure, the at least one outlet being disposed in the second bearing surface along a lower portion of the bearing sleeve.

10. The bearing assembly of claim 1, wherein the first bearing element is a first bearing ring surrounding and fixed relative to a shaft extending along a longitudinal axis of rotation extending at least partially horizontally, the first bearing surface extending outwardly from the shaft and transverse to the longitudinal axis, and the second bearing element is the one of the first and second bearing elements and is a second bearing ring.

11. A bearing assembly comprising a first bearing element defining a first bearing surface and a second bearing element defining a second bearing surface, one of the first and second bearing elements having a fluid channel with an inlet for receiving a bearing fluid and at least one outlet in the bearing surface of the one of the first and second bearing elements, the first bearing element being configured for rotation at a design rate of rotation relative to the second bearing element with the first bearing surface facing the second bearing surface, the first bearing element applying a force directed from the first bearing surface toward the second bearing surface during rotation at a reduced rate of rotation less than the design rate of rotation; wherein the second bearing element is a shaft that is fixed relative to an external structure and extends along a longitudinal axis of rotation of the first bearing element, the longitudinal axis extending at least partially horizontally, and the at least one outlet being disposed in the second bearing surface along an upper portion of the shaft.

12. A bearing assembly comprising a first bearing ring defining a first bearing surface and a second bearing ring defining a second bearing surface, the second bearing ring having a fluid channel with an inlet for receiving a bearing fluid and at least one outlet in the second bearing surface, the first bearing ring being configured for rotation at a design rate of rotation relative to the second bearing ring with the first bearing surface facing the second bearing surface, the first bearing ring applying a force directed from the first bearing surface toward the second bearing surface during rotation at a reduced rate of rotation less than the design rate of rotation, the second bearing ring surrounding and fixed relative to a shaft extending along a longitudinal axis extending at least partially horizontally, the second bearing surface extending outwardly from the shaft and transverse to the longitudinal axis.

13. The bearing assembly of claim 12, wherein the first and second bearing surfaces are planar and extend radially relative to the shaft.

14. The bearing assembly of claim 12, wherein the first and second bearing surfaces are frustoconical.

15. The bearing assembly of claim 12, wherein the second bearing element is the one of the first and second bearing elements and the fluid channel includes a plurality of outlets in the second bearing surface including the at least one outlet, the plurality of outlets being distributed at least partially circumferentially around the second bearing ring.

16. A method comprising:
rotating a first bearing element relative to a second bearing element at a reduced rate of rotation that is below a design rate of rotation while the first bearing element applies a force acting in a first direction from a first bearing surface of the first bearing element toward a facing second bearing surface of the second bearing element;
while rotating at the reduced rate of rotation, pumping a bearing fluid through one or more openings in the first bearing surface and into a gap between the first and second bearing surfaces, the bearing fluid being pumped through each of the one or more openings in a respective second direction that is at least partially opposite to the first direction; and
increasing the rate of rotation from the reduced rate of rotation to the design rate of rotation.

17. The method of claim 16, wherein the bearing assembly is operating in a hydrostatic state when rotating the first bearing element at the reduced rate of rotation.

18. The method of claim 17, wherein the bearing assembly is operating in a hydrodynamic state when rotating the first bearing element at the design rate of rotation.

* * * * *